W. PHELPS.
MECHANICAL MOVEMENT.
No. 29,000.   Patented July 3, 1860.
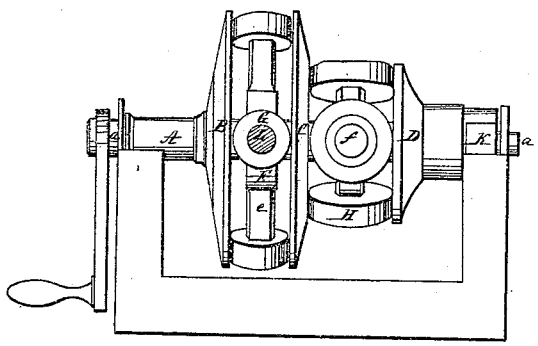
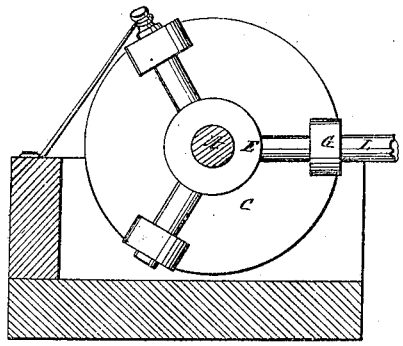
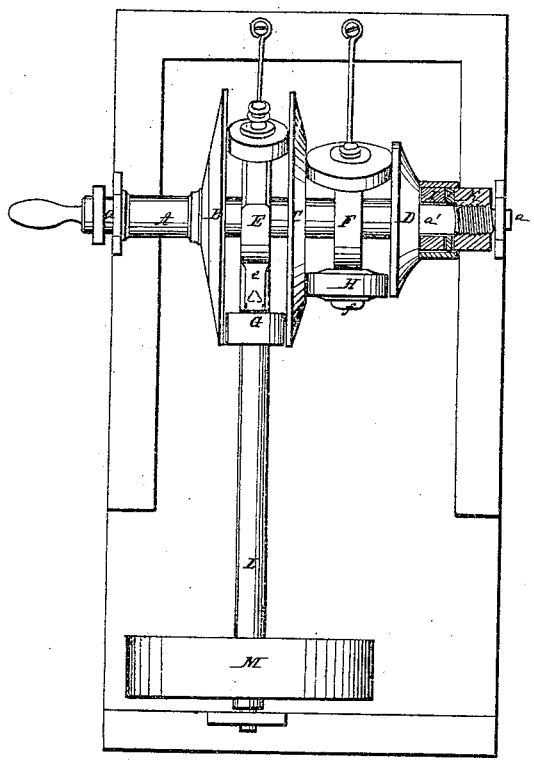
Witnesses:
James H. Gridley
John W. Chute
Inventor:
William Phelps
per Wright Brothers Attorneys

UNITED STATES PATENT OFFICE.

WILLIAM PHELPS, OF SYCAMORE, ILLINOIS.

TRANSMITTING MOTION TO MACHINERY.

Specification of Letters Patent No. 29,000, dated July 3, 1860.

*To all whom it may concern:*

Be it known that I, WILLIAM PHELPS, of Sycamore, Dekalb county, Illinois, have invented a new and useful Mode of Communicating Motion to Machinery; and I hereby declare the following to be a full and exact description of the same, reference being had to the accompanying drawings, making part of this specification.

The subject of my said invention is a peculiar combination of disks and friction wheels adapted to communicate a continuous rotary motion without the use of cog gearing.

In the accompanying drawings Figure 1, is an elevation of the apparatus. Fig. 2 is a plan of the same. Fig. 3 is a section at $xx$.

A is a shaft rotating on journals $aa$.

B, C and D are three parallel disks, concentric with the shaft A. The disk B is keyed securely to the shaft so as to rotate therewith; the disk C is journaled loosely on the shaft so as to rotate independently, and the disk D is formed with a square eye, feather slot or equivalent device and fitted upon the square or feathered portion $a'$ so as to be rotated with the shaft A but capable of longitudinal motion thereon.

E and F are yokes journaled loosely on the shaft A and each provided with radial arms $e, f$, upon the ends of which are journaled rollers G, H. The rollers G are gripped between the faces of the disks B and C and the rollers H between the faces of the disks C and D.

I is a spring of gum elastic or other suitable material, compressed between the disk D and a washer J so as to exert any desired pressure on the disk, regulated by the adjustment of a screw nut K upon the shaft.

Motion is communicated to the machinery to be driven by one or more shafts rigidly attached to any of the rollers G or H as at L. M represents a band pulley on the shaft L.

The position of the shaft may be either horizontal, vertical, or inclined, and the power may be applied by sweeps or gearing to either end of the shaft or to the disk B or D.

The disks are formed convex on their faces where they come in contact with the rollers, in order to avoid the friction and consequent loss of power caused by the contact of extended surfaces rotating in planes perpendicular to each other.

The spring I serves to compensate for any irregularities in the rollers or disks so as to maintain at all times an equal pressure between their surfaces.

The importance of the above described invention is based upon the equalization both of pressure and rotative force applied to opposite sides of the rollers employed to transmit motion to the shafting. The pressure is produced between the disk B and nut K, both attached to the main shaft A without any connection with the bearings of the side shaft. The whole apparatus is so arranged that any desired pressure may be applied to the peripheries of the rollers without perceptible increase of pressure on any rubbing surface and by this means is produced an unfailing means of multiplying and transmitting mechanical movement without the loss by friction peculiar to the use of cog gearing.

I do not desire to confine myself to the precise form arrangement or proportions of the various parts herein described while the essential principles of the invention are maintained.

I claim as new and of my invention herein:

The combination of the disks B, C and D and rollers G and H operating substantially as and for the purposes set forth.

In testimony of which invention, I hereunto set my hand.

WILLIAM PHELPS.

Witnesses:
OCTAVIUS KNIGHT,
JAMES H. GRIDLEY.